Jan. 28, 1947.  G. B. KISTIAKOWSKY ET AL  2,414,880
PROCESS OF MAKING CYCLOBUTANE
Filed May 24, 1941
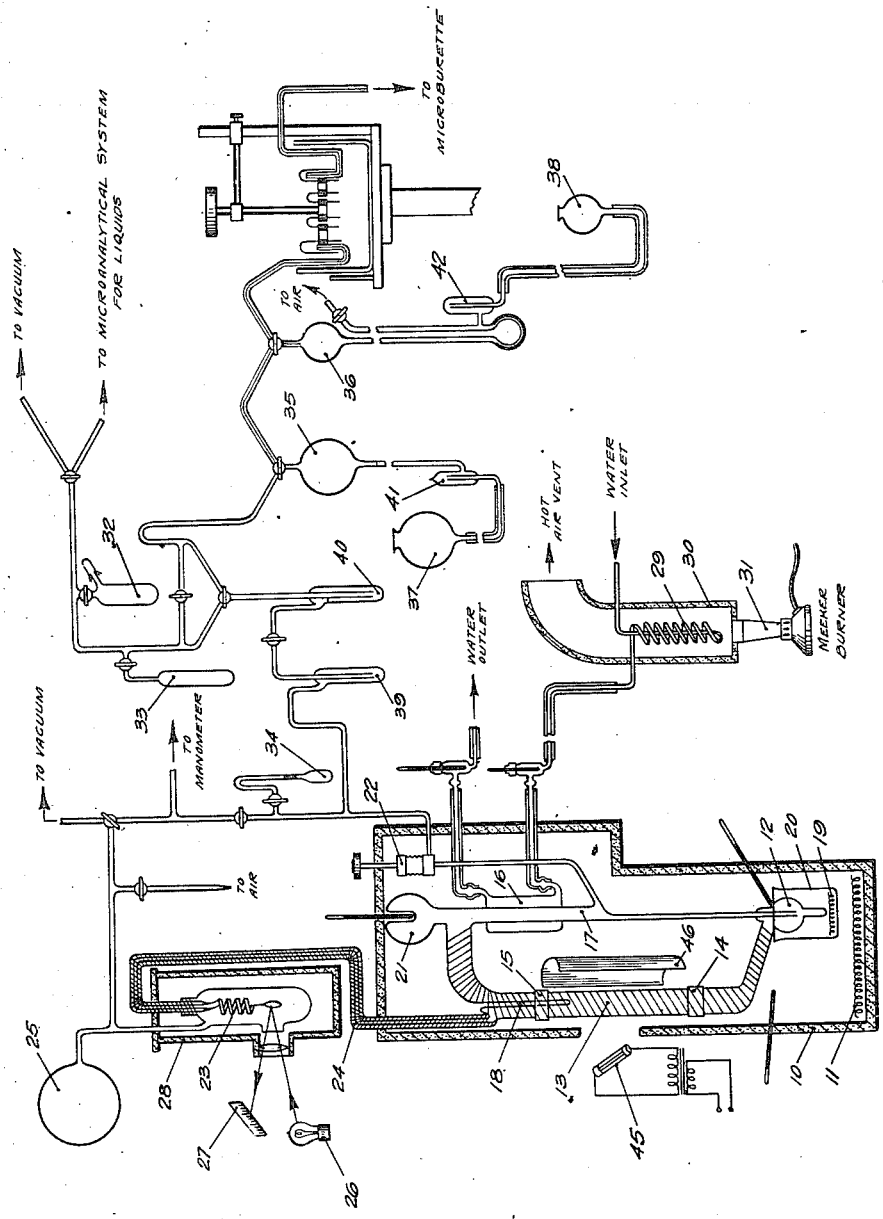
INVENTORS.
George B. Kistiakowsky & Sidney W. Benson.
BY Kenway & Witter attys Patented Jan. 28, 1947

2,414,880

UNITED STATES PATENT OFFICE 2,414,880

PROCESS OF MAKING CYCLOBUTANE

George B. Kistiakowsky and Sidney William Benson, Cambridge, Mass., assignors to Godfrey L. Cabot, Inc., Boston, Mass., a corporation of Massachusetts Application May 24, 1941, Serial No. 395,076

2 Claims. (Cl. 204—162)

This invention consists in a novel process of making cyclobutane and rests upon our discovery that the photolysis of cyclopentanone under certain conditions yields cyclobutane as one of the major products.

So far as we are aware no convenient nor commercially practicable process of producing cyclobutane has been heretofore available. Cyclopentanone however, may be readily prepared by heating the calcium salts of the corresponding di-basic acid, for example, by heating calcium adipate, the calcium salt of adipic acid.

In carrying out the process of our invention cyclopentanone is refluxed and superheated vapors thereof are passed before a source of radiant energy, such for example, as a mercury arc. The process results in the formation of a substantial percentage of cyclobutane from the raw material of the process, and the formation of by-products, ethylene and CO, from which the cyclobutane may be separated readily and practically completely. It is these characteristics which render the process of our invention of practical and commercial value. The overall reaction may be quantitatively represented as

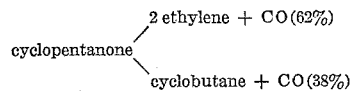

In practice we have found that when the process is carried out in a temperature range of 180° C. to 350° C. and in a pressure range of 10 to 200 mm. of mercury, the products of the photolysis are substantially independent of both temperature and pressure. Preferably and as herein shown the reaction is carried out in a continuous flow system. Photolysis may be effected by passing superheated vapors of cyclopentanone before a high pressure, high intensity mercury arc. An important characteristic of the process of our invention is the employment of a high intensity source of radiation since by this expedient it is possible to expedite the process and increase the amount of product resulting therefrom. The absorption spectrum of cyclopentanone shows an absorption of from 2200 Å to 3300 Å with a maximum of 3000 Å. The spectrum also shows fine structure with well defined peaks on both sides of this maximum.

The process may be carried on either in a closed system, where the products are allowed to accumulate in a reaction vessel, or in a continuous system in which the products are continuously pumped off. As carried out in both systems, however, the products of the process are identical and are apparently stable to radiation. After exposure the products may be pumped off and separated by distillation. In this way separation of substantially 95% of the products may be effected and by further distillations the separation may be made practically complete. No other products usually occur except the gaseous products indicated by the foregoing equation.

The cyclobutane fraction may readily be isolated and identified by its physical and chemical properties. The molecular weight determinations indicate a figure of 55.6 to 56.0. Density measurements show a density of 0.689 gr./cc. to 0.703 gr./cc. at 0° C. The vapor pressures of all samples of the product are lower than the vapor pressure of the highest boiling butene and the boiling point of the liquid cyclobutane is approximately 12.5° C. The freezing point of the highest melting butene is −106° C. whereas the freezing point of the cyclobutane samples was from −90° C. to −93° C. The cyclobutane product shows complete saturation when tested with bromine. The cyclobutane samples show no bromination at 0° C. after standing for hours.

While the process of our invention is not limited to any specific apparatus, it may be better understood and appreciated from the following description of one satisfactory form of apparatus shown diagrammatically in the accompanying drawing.

The illustrated apparatus includes a reaction oven 10 which may be conveniently made of asbestos mill board cut to shape and provided with a hinged door giving access to the reaction vessel. The oven is heated by a resistance coil of Nichrome wire 11 located near the floor of the oven and the energy input is controlled by a rheostat (not shown). The flow system consists of a pot 12 in which the cyclopentanone is boiled, a reaction arm such as the quartz tube 13 sealed to the system by graded seals 14 and 15, and a condenser 16 including a return tube 17 that condenses the ketone and allows it to return to the pot 12. A thermocouple well 18 is provided in the quartz tube out of range of the radiation. The pot is shown as heated by a Nichrome resistance unit 19 placed in a close-fitting beaker 20 and covered with aluminum foil to diminish heat losses.

The mercury arc lamp 45 is located close to the quartz tube 13 and opposite an opening provided in the wall of the reaction oven for that purpose. One suitable lamp is a one kilowatt water-cooled lamp manufactured by the General Electric Company, operating at 840 volts and 1.4 amperes and a mercury pressure of about 80 atmospheres. The initial light is estimated at 65,000 lumens and the brightness at 195,000 candles per square inch. It is desirable to protect the lamp with a safety valve and provide a reflector 46 behind the tube. The spectrum of the lamp shows an almost continuous background through the visible and ultraviolet down to about 2800 Å while its observed color is a blue-white light.

In order to prevent condensation of the ketone in the reaction arm, the tubes connecting the quartz tube in the system and the quartz tube itself are wound with Nichrome resistance wire—about 4 turns to the inch. The heat supplied by this heated wire maintains the cyclopentanone vapor in superheated condition within the reaction arm 13. By "superheated" we mean that the vapor is maintained at a temperature above the boiling point of the liquid and thus is free of condensed vapor and contains no liquid of condensation. In practice the parts directly above and directly below the graded seals are wrapped with asbestos to shield them from stray radiation. At the head of the reaction arm is provided a ballast flask 21 which serves to buffer the pressure variations in the system. Preferably this should be wrapped in asbestos to shield it from light and also to maintain its temperature. The rest of the system, including the condenser 16, the metal valve 22 and the return leads to the pot 12, is preferably wrapped in several layers of aluminum foil.

The pressure of vapors in the reaction arm may be measured by a spiral manometer 23 connected to the system by the capillary tube 24. This tube is also preferably wrapped with asbestos and wound with Nichrome resistance wire by which it is heated, in order to prevent the possibility of condensation in this part of the system.

The lower end of the quartz spiral is drawn down and carries an ordinary silvered galvanometer mirror. The jacket of the spiral is fitted with a Pyrex window and is connected at its upper end to a ballast flask 25 and a mercury U-tube manometer. Stop cocks are provided at convenient locations so that air may be admitted or pumped out of the system. To indicate the position of the spiral a lamp 26 and scale 27 are provided at a suitable distance from the spiral. In practice the spiral will give 1.03 mm. deflection on the scale per mm. of mercury difference in pressure between the two sides of the system. The spiral itself is heated within an open top oven 28, the oven being wound with turns of Nichrome resistance wire and covered with asbestos. In practice the spiral and spiral leads are kept 50° to 100° C. above the temperature of the condenser 16.

In order to vary the vapor pressure of the reflux in the ketone, circulating water in the condenser is preferably passed through a preheating system. By this provision it is readily possible to obtain any vapor pressure from about 1° C. to 100° C. The preheater, as herein shown, may comprise a copper spiral 29 mounted in an asbestos insulated tube 30 and heated by a Meeker burner 31. By adjusting the rate of flow of the water through the spiral 29 the temperature may be precisely adjusted.

A receiving bulb 32 is conveniently placed in the system and in operation the freshly distilled ketone is supplied to this bulb. Also included in the system and connected by suitable tubes are a storage bulb 33 for pure ketone, a small storage bulb 34 for collecting ketonic residues, a Toepler pump 35 for separation of the fractions and a second Toepler pump 36 and manometer for storage, measurement and transfer of fractions, leveling bulbs 37 and 38 for the Toepler pumps, and traps 39 and 40 for fractionation products and traps 41 and 42 to collect air from the mercury leveling bulbs.

In operation, after the ketone has been supplied to the receiving bulb 32 and preliminary purging of the system effected by pumping, the ketone distills into the storage bulb 33. The system is then heated to about 125° C. and the quartz tube 13 to about 350° C. The vacuum of the system should best be less than $10^{-4}$ mm. of mercury. A portion of the ketone is now distilled in vacuum from the bulb 33 into the trap 40 and thence into the trap 39. Here it is warmed up to 20° C. and the metal valve 22 opened allowing the ketone to distill over and reach the pot 12. The metal valve is then closed and the system brought to the desired temperature, this requiring about 30 minutes with the illustrated apparatus. The mercury lamp is now turned on and the vapor current begins to pass upwardly into the quartz tube 13 and through the intense field of radiation of the lamp wherein the photolysis of the cyclopentanone vapor occurs. During the first few minutes the current in the quartz column may be lowered to compensate for the heat radiated by the lamp. Within the first 5 minutes however, the system usually reaches thermal equilibrium and the overall variation in the thermocouple temperature during the run does not usually exceed 10° C. At the condenser 16 the vapor pressure of the ketone is determined by the temperature of the cooling liquid. At the pot 12 it is higher than this, and the pressure in the quartz tube 13 is somewhere in between.

It will be seen that the refluxer, the traps 39 and 40 and the bulb 33 are all connected directly with the Toepler pump 35. The capacity of these elements is such that a few operations of the pump 35 are sufficient to remove approximately 99.5% of the gaseous fraction. In practice, after a run of about 30 or 40 minutes the system is allowed to cool, the traps 39 and 40 refrigerated with liquid nitrogen (−196° C.), or freezing pentane (−156° C.), as the case may be, and pumping commenced with the Toepler pump 35. The gases are collected in the bulb 36 or pumped out of the system.

The following table indicates the results obtained from typical runs and covers a possible change in lamp intensity of as much as 60% in the course of the 8 runs.

| Run | $P_m$ | Cond. | Therm. | CO | $C_2H_4$ | $C_4H_8$ |
|---|---|---|---|---|---|---|
| | | ° C. | ° C. | | | |
| 1 | 220 | 50 | 188 | 37.6 | 45.1 / 60.1% | 13.4 / 35.6% |
| 2 | 140 | 35 | 181 | 26.6 | 32.9 / 62% | 10.1 / 38% |
| 3 | 39 | 35 | 198 | 12.31 | 15.37 / 61.8% | 3.24 / 38.0% |
| 4 | 45 | 35 | 300 | 10.29 | 12.92 / 62.9% | 3.94 / 38.3% |
| 5 | 26 | 29 | 199 | 7.35 | 9.06 / 61.7% | 2.84 / 38.6% |
| 6 | 62 | 46 | 198 | 10.47 | 12.37 / 61.5% | 3.80 / 36.3% |
| 7 | 147 | 77 | 201 | 17.92 | 22.12 / 61.6% | 7.04 / 39.3% |
| 8 | 145 | 50 | 198 | 15.17 | 18.59 / 61.4% | 5.77 / 38.0% |

Column 1 gives the number of the run, column 2 gives the pressure during the run, $P_m$, and column 3 gives the temperature of the condenser. Column 4 gives the thermocouple temperature, and the last three columns give the amounts of gas, expressed in cc. at NTP that we recovered. The percentages, express these amounts in terms of the total ketone decomposition, based on the production of CO.

The first gas fraction obtained is pure carbon monoxide, the second gas fraction is ethylene, and the third fraction, that is to say the $C_4$ fraction, is exclusively cyclobutane, and there are no $C_4$ olefins found in the decomposition of cyclobutane.

In the foregoing disclosure we have referred only to the preparation of cyclobutane from cyclopentanone but it is within the contemplation of our invention and within the scope of the appended claims to produce by photolysis derivatives of cyclobutane from derivatives of cyclopentanone; for example, to produce methyl cyclobutane from methyl cyclopentanone, or dimethyl cyclobutane from dimethyl cyclopentanone.

Having thus disclosed our invention and one typical manner in which it may be carried out we claim as new and desire to secure by Letters Patent:

1. The process of making cyclobutane which consists in subjecting cyclopentanone in the vapor stage to irradiation by visible and ultra-violet light rays in a temperature range of 180° C. to 350° C. and a pressure range of 10 to 200 mm. of mercury.

2. The process of making cyclobutane which consists in vaporizing cyclopentanone, superheating the resulting vapor, and passing the superheated vapor thereof before a mercury arc.

G. B. KISTIAKOWSKY.
SIDNEY WILLIAM BENSON.